DIGITAL COMPUTER HAVING HIGH SPEED BRANCH OPERATION

Filed March 25, 1966 2 Sheets-Sheet 1

INVENTOR.
ROGER E. PACKARD
WILLIAM F. BUSTER
BY
Christie, Parker & Hale
ATTORNEYS

DIGITAL COMPUTER HAVING HIGH SPEED BRANCH OPERATION

Filed March 25, 1966 2 Sheets-Sheet 2

INVENTOR
ROGER E. PACKARD
WILLIAM F. BUSTER

BY Christie, Parker & Hale
ATTORNEYS 3,408,630
DIGITAL COMPUTER HAVING HIGH SPEED BRANCH OPERATION Roger E. Packard, Glendora, and William F. Buster, West Covina, Calif., assignors to Burroughs Corporation, Detroit, Mich., a corporation of Michigan Filed Mar. 25, 1966, Ser. No. 537,572
14 Claims. (Cl. 340—172.5)

ABSTRACT OF THE DISCLOSURE

A digital computer having apparatus for expediting the fetch of conditional branch instructions. Detection circuitry detects operation codes within an instruction which specify that a conditional branch operation is being fetched and responsive to such detection determines whether the branch conditions are satisfied. Upon a determination that the branch conditions have not been satisfied, control circuitry terminates the fetch of the conditional branch instruction thereby enabling the fetch of the next instruction to commence without delay.

This invention relates to high speed digital computers and, more particularly, to such a computer having a high speed branch operation whereby conditional branch operations need not be completely fetched and prepared in those instances when the branch is not to be taken.

The operation of an automatic digital computer splits naturally into two phases which normally alternate: the fetch phase and the execute phase. During the fetch phase of operation, the next instruction to be executed is selected from computer memory and transferred to one or more control registers after which selected modifications of the instruction may be introduced by means of base addition, indexing, indirect addressing, etc. During the execute phase of operation, an operation code segment of the instruction is decoded and the particular operation specified by the instruction is executed.

Both the instructions and data operands utilized in the execution of instructions may be stored in the same memory. The computer will ordinarily start with a word stored in some specified location in memory and interpret this word as an instruction. It will subsequently take instruction words from the memory locations in order unless a halt or branch instruction is encountered. Data to be used in executing the instruction will ordinarily be stored in another part of the memory. Flexibility is achieved since either instructions or data can be stored in the same storage registers.

Although some relatively small computer systems combine the fetch and execute phases of operation, most larger systems separate them. Separation of fetch and execute entails the provision of registers into which are stored the operation code and any address included in the instruction being fetched. Completion of the fetch of an instruction and its storage in registers prior to the commencement of the execute phase enables much faster operation of the computer system to be achieved. Thus, separation of fetch and execute eliminates the necessity of constantly going to the memory during the execute phase to obtain addresses included within the instruction being executed.

In systems wherein the fetch phase and execute phase are separate, the operation of the fetch phase is ordinarily independent of the particular operations called for by the instructions being fetched. Thus, each instruction is fully brought out from memory, and modifications are performed on addresses included within the instruction, prior to any determination of the particular operation called for by the instruction. In many computer programs, however, branch instructions amount to forty percent or more of the instructions making up a program. Many of these branch instructions are conditional branches and are to be executed only if particular conditions set up elsewhere within the system have been satisfied. As a result, a considerable amount of time is wasted in such systems whenever a conditional branch instruction is fully fetched and it is subsequently determined that the conditions are not satisfied and that the instruction is therefore not to be executed.

The present invention provides an improved arrangement for detecting, during the fetch phase of operation, the presence of a conditional branch operation, determining whether the branch conditions are satisfied, and bypassing the remainder of the fetch operation in those cases where the branch conditions are not satisfied. As a result, systems utilizing the present invention achieve a considerable reduction in the time required for such operations.

In brief, the improved operation of the present invention is achieved by detecting those operation codes calling for a conditional branch instruction as soon as the operation code of each instruction is brought out of memory. Upon detection of such codes, the comparison conditions are checked to determine whether the branch is to be taken. Each instruction word comprises a plurality of bits which are divided into syllables. The instruction words are brought out of memory a syllable at a time with the first syllable including the operation code. Branch instructions are brought out in two steps, the first syllable including the operation code of the instruction and the second syllable including an address field. Whenever the branch is to be taken, the address field is brought out of memory and manipulations are performed upon it, e.g., base addition, indexing, and indirect addressing, in order to determine an absolute address to which the program is to branch. Whenever the branch is not to be taken, means are provided whereby the fetch phase of the succeeding instruction is commenced. Consequently the address field associated with a non-taken branch instruction is not brought out of memory and manipulations which otherwise would be performed upon that address are eliminated. A significant time-saving is thereby achieved.

For a complete understanding of the invention, reference should be made to the accompanying drawing in which.

Figure 1B:
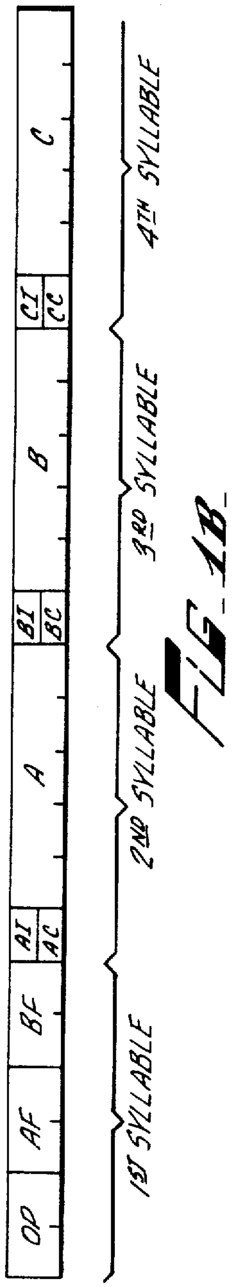
FIGS. 1A and 1B depict the format of a typical branch instruction and non-branch instruction, respectively, which may be utilized in conjunction with the present invention.
Figure 1A:
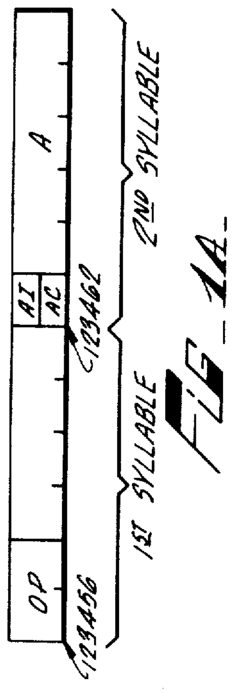
Figure 2:
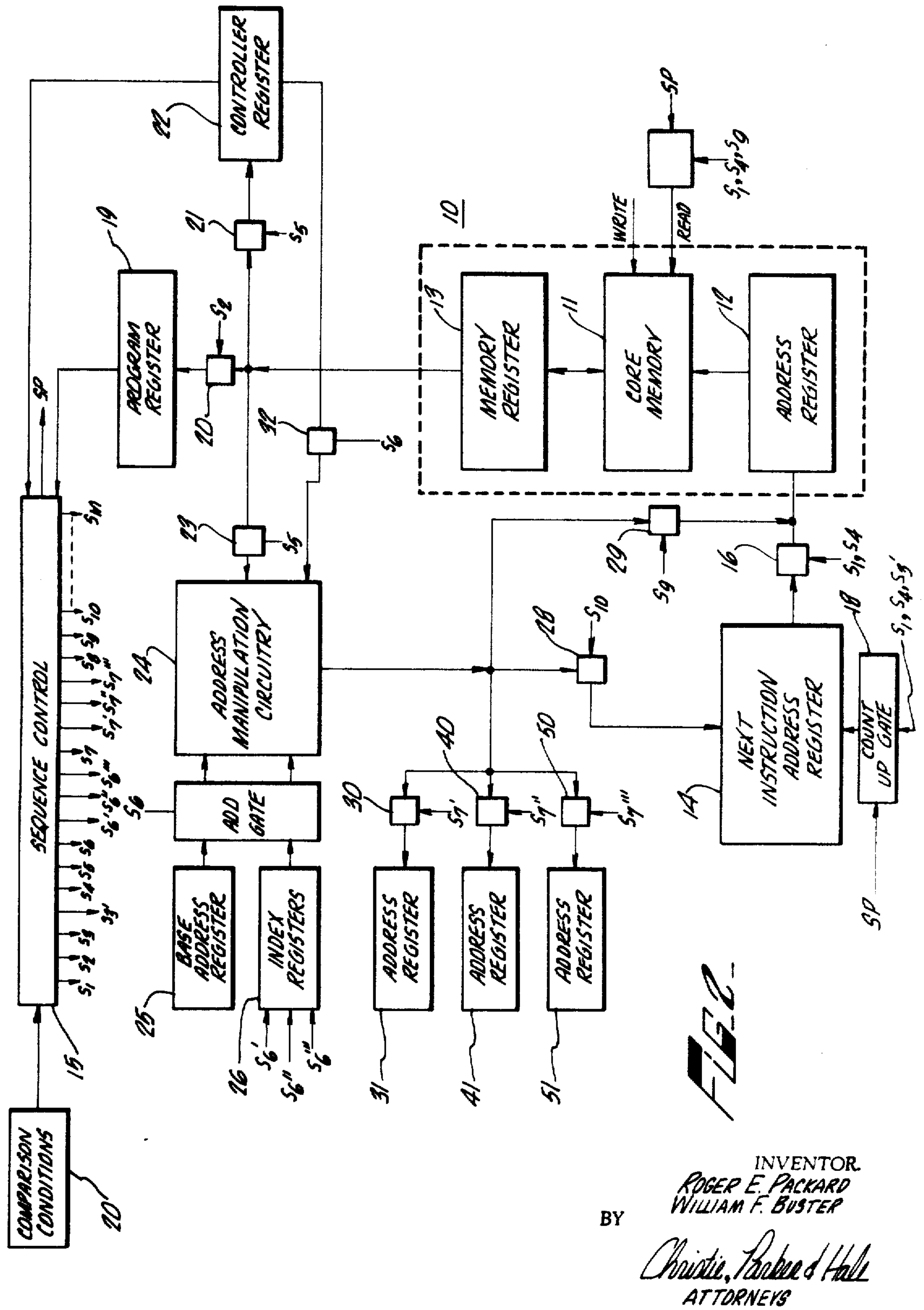
FIG. 2 depicts a schematic block diagram of one embodiment of the present invention utilizing instruction words of the format depicted in FIGS. 1A and 1B.

FIGS. 1A and 1B depict a format of typical branch and non-branch instructions, respectively, which may be utilized in conjunction with the embodiment of the present invention shown in FIG. 2. FIG. 1A depicts a branch instruction which consists of twelve binary coded decimal digits with each decimal digit comprising four binary bits. Each decimal digit is individually addressable in the embodiment shown in FIG. 2, and the instruction is considered to be divided into two six-digit syllables. The first two digits of the first syllable denote a particular instruction and are referred to as operation code digits. In the format of the branch instruction shown in FIG. 1A, the remaining four digit locations of the first syllable are not used. The second syllable of the branch instruction shown in FIG. 1A comprises six digits which denote an address field. The low order five digits of the address field represent a base relative address. The high order digit is split. Two bits of this digit, designated index bits, denote whether indexing is to be used and if so which of several index registers is to be used. The remaining two bits of the high order digit, designated controller bits, denote whether indirect addressing is to occur and also may be utilized to expand the number of addresses directly addressable by a branch instruction. Although each digit of the instruction is individually addressable, a syllable of six digits will ordinarily be read out of memory during a single readout operation.

FIG. 1B depicts a typical non-branch instruction comprising four syllables. The first syllable includes two operation code digits and the next four digit positions are utilized as variants. The first two variant digit positions designated AF may, for example, indicate the length of a data operand indicated by the A address field and the remaining two variant digit positions designated BF may, for example, indicate the length of an operand indicated by the B address field. The second, third, and fourth syllables denote the A address field, B address field, and C address field, respectively. In each of these syllables the low order five digits represent a base relative address and the high order digit is split into indexing bits and control bits.

FIG. 2 depicts a schematic block diagram of one embodiment of the present invention utilizing instruction words of the format depicted in FIGS. 1A and 1B. In FIG. 2 the numeral 10 indicates generally a memory unit which, for example, includes a core memory 11 which is addressed by the contents of an address register 12.

In the embodiment shown, six-digit syllables are transferred in and out of the core memory 11 through a memory register 13. Program instructions are stored in core memory 11 in sequential locations. The instructions are brought out of memory in response to addresses established in Next Instruction Address Register 14. In the embodiment shown, registers 12, 13, and 14 are six-digit registers. Since each digit stored in memory 11 is individually addressable and since six-digit syllables are read out of memory 11 and stored into register 13 during each read operation of the embodiment of the present invention shown in FIG. 2, register 14 will be counted up by "six" following each read operation. Thus, for example, if the first digit of the operation code of the branch instruction shown in FIG. 1 is located in address 123456, the first syllable of this instruction will be read out of core memory during a read operation commencing at a time when register 14 stores the address 123456. Subsequent to this read operation, register 14 would be counted up by "six" so as to store address 123462 and the second syllable of this instruction would thereby be transferred into register 13 during a subsequent read operation.

Operation of the embodiment shown in FIG. 2 is under the control of a sequence control unit 15. Unit 15 is a central control unit which typically includes a clock pulse source and a sequence counter by means of which the sequence control unit is caused to step through a series of sequential steps in which output control lines designated by $S_1$ through $S_m$ are energized in a controlled sequence.

Sequence control unit 15 also includes combinational gating circuitry which, in response to signals applied to unit 15, controls the sequence in which the output control lines are energized. Such sequence control units are well known in the computer and data processing art.

Initially the sequence control unit 15 is in the $S_1$ state during which state the first syllable of the next instruction is brought out of memory 11 and inserted into memory register 13. To this end the contents of register 14 which comprise the address of the initial digit of this syllable are transferred to address register 12 through AND gate 16. Sequence pulses designated SP are generated by sequence control unit 15 at the time the control unit changes from one control state to the next. An SP signal generated at the end of the $S_1$ state reads the addressed syllable out of core memory 11 into memory register 13, the SP signal being gated by gate 17 to the read input of core memory 11. At this time gate 18 counts up register 14 by "six" so as to store the address of the succeeding syllable stored in memory 11.

At the completion of the $S_1$ state, the sequence control unit 15 advances to the $S_2$ state. During the $S_2$ state the syllable in memory register 13 is transferred to a six-digit program register 19 by means of AND gate 20. The first syllable of the instruction, including the operation code digits, is now stored in register 19. The central control unit now advances to the $S_3$ state.

During the $S_3$ state, combinational gating circuitry within sequence control unit 15 is utilized to detect whether the particular operation code digits stored in register 19 denote a conditional branch operation. If a conditional branch operation is detected, means are provided whereby conditions previously set up within a computer are compared with the particular conditional branch operation detected in order to determine whether its conditions have been satisfied. This comparison is indicated generally by block 20 denoted COMPARISON CONDITIONS which block may include, for example, a number of flip-flop circuits. These flip-flops are set by conditions previously set up within the system and may indicate by their respective states whether or not the conditions called for by the particular branch instruction detected have been satisfied. If the instruction is a conditional branch instruction and the comparison conditions are satisfied, indicating that the branch is to be taken, the sequence control unit 15 advances to the $S_4$ state.

During the $S_4$ state, the second syllable of the branch instruction is read out of memory 11 and stored in register 13. The SP signal generated at the end of the $S_4$ state again counts up register 14 by six. At the completion of the $S_4$ state, the sequence control unit 15 advances to the $S_5$ state.

During the $S_5$ state, the second syllable stored in register 13 is split. The first digit of this syllable comprising index and controller bits is transferred via gate 21 to controller register 22. The remaining five digits of the second syllable, denoting a base relative address, are transferred via gate 23 to a register included within address manipulation circuitry 24. Circuitry 24 comprises well known elements such as an adder and an accumulator register and is shown herein in block diagram form. At the completion of the $S_5$ state the sequence control unit 15 advances to the $S_6$ state.

During the $S_6$ state various manipulations may be performed upon the relative address transferred from register 13 to circuitry 24. One manipulation which always is performed upon the relative address is the addition to it of digits stored in base address register 25. The five-digit relative address contained within the second syllable of the instruction being fetched assumes that the program of which it is a part starts at 00000 in core memory 11. Since, however, a number of programs may be stored in memory 11, all relative addresses stored in a particular program may advantageously have predetermined digits added thereto during the fetch phase of operation in order to determine the absolute address within memory 11 which will be utilized during the succeeding execution phase of operation. In the embodiment of FIG. 2 these predetermined digits are stored in base address register 25 and are automatically added to the relative address during the $S_6$ state. Additionally, during the $S_6$ state, combinational gating within sequence control unit 15, utilizing the particular bits stored in controller register 22, determine whether additional manipulations are to be performed on the relative address. Thus, if the index bits stored in register 22 indicate that indexing is to be performed upon the relative address, the indexing manipulation is also performed during the $S_6$ state.

Block 26 denoted INDEX REGISTERS includes three six-digit index registers. The two index bits stored in register 22 determine whether any indexing has been performed and if so, which one of the three index registers is to be utilized. Signals $S_6'$, $S_6''$, $S_6'''$ are generated during state $S_6$ by control unit 15 whenever indexing is to be performed. The particular one of these signals generated determines which one of the index registers is to be utilized. In addition to the six digits stored in each index register an additional digit location is utilized to store a sign. If indexing is to be performed upon the relative address, the value stored in the selected index register is added or subtracted, in accordance with its sign, to the relative address in circuitry 24 via gate 27. Additionally, during state $S_6$, controller bits stored in register 22 are utilized to determine whether indirect addressing is to be utilized. If the sequence control unit 15 determines that indirect addressing is not to be performed, the central unit commences to the $S_{10}$ state.

During the $S_{10}$ state, the address established within circuitry 24 by the addition to the relative address of the contents of register 25 and the addition thereto of the contents of one of the index registers within block 26, if indexing were performed, is transferred to register 14 via gate 28. At this point the execution of the branch operation has been completed and the address stored in register 14 is the absolute address of the instruction to which the program is to branch. The block 24 designated Address Manipulation Circuitry includes well known circuitry such as registers and an adder which operate in a well known manner whereby the relative address initially transferred thereto may have added thereto the contents of register 25 and additionally may have added thereto the contents of one of the index registers within block 26 whenever indexing as well as base addition is to be performed.

The sequence of operations of the embodiment of FIG. 2 for a conditional branch operation which is to be taken and for which no indirect addressing is performed, has been described hereinabove. The sequence of operations, when indirect addressing is performed on such an instruction, will now be described.

During the $S_6$ state, sequence control unit 15 determines whether the controller bits stored in register 22 indicate that indirect addressing should be performed. If the controller bits indicate that indirect addressing is to be performed, the sequence control unit 15 advances to the $S_9$ state. During the $S_9$ state the absolute address established in a register within block 24 is transferred to register 12 via gate 29. The address transferred from a register of circuitry 24 to register 12 is an absolute address denoting a particular location within memory 11. This absolute address was established within the register of circuitry 24 by the addition of the contents of base register 25 to a relative address previously transferred from register 13 and by the addition of the contents of one of the index registers 26 if indexing were also indicated, both in the manner described previously. Thus, the absolute address in a register of circuitry 24, established in the manner previously described, is directly transferred to register 12 when indirect addressing is to be performed.

During an SP signal generated at the end of the $S_9$ state, a syllable commencing at the address stored in register 12 is transferred from memory 11 to register 13. At the completion of the $S_9$ state, the central control unit 15 reverts to the $S_5$ state. During the $S_5$ state, as previously described, the syllable stored in register 13 is split, a first digit thereof being transferred to register 22 and the remaining five digits thereof being transferred to a register of circuitry 24. Again the bits stored in register 22 comprise indexing bits and controller bits and the digits transferred to the register of circuitry 24 comprise a relative address. Again, as previously described, the contents of register 25 are added to the relative address stored in circuitry 24 via gate 27, and the indexing bits stored in register 22 are decoded by sequence control unit 15 to determine whether indexing is to be performed. If indexing is to be performed it is carried out as previously described. Again control unit 15 decodes the controller bits stored in register 22 to determine if additional indirect addressing is to be performed. If so, the absolute address established in the register of block 24 is again transferred to register 12 and the sequence of operation just described are repeated. Indirect addressing can be repeated any number of times.

Finally there will be established in the register of block 24 an absolute address for which indirect addressing is not to be performed. At this point the sequence control unit 15 advances to the $S_{10}$ state and the absolute address established in a register of circuitry 24 is transferred to the next instruction address register 14, as previously described.

The fetch of conditional branch instructions which are to be taken has now been described for such instructions both when indirect addressing is to be performed and when it is not performed. The fetch of a non-branch instruction is quite similar to that for a branch instruction which is taken. The non-branch instruction depicted in FIG. 1B comprises four syllables. The sequence of operations in fetching such an instruction is virtually identical to that for a branch instruction which is taken, for states $S_1$ through $S_5$. In the $S_3$ state, however, all operation code digits stored in register 19 are recognized by the combinational gating of sequence control unit 15 as being either branch or non-branch instruction and non-branch instructions are decoded only to the extent of determining the number of address fields associated with the non-branch instruction.

From the $S_5$ state the sequence control unit 15 again advances to the $S_6$ state. During the $S_6$ state base addition and indexing are performed in a manner identical to that described for the branch operation. Additionally, any indirect addressing is performed at this time in a manner identical to that previously described. Eventually an absolute address is established in circuitry 24 for which no indirect addressing is to be performed and at this point the sequence control unit 15 advances to the $S_7$ state.

During the $S_7$ state, the absolute address established in circuitry 24 is transferred via gate 30 to a first instruction address register 31. At this point, an absolute address corresponding to the first address associated with the non-branch instruction depicted in FIG. 1A has been stored in first instruction address register 31. At the completion of the $S_7$ state, the sequence control unit 15 is reset to state $S_4$.

During state $S_4$ the third syllable of the non-branch instruction depicted in FIG. 1B is brought out of memory 11 and stored in register 13, and the sequence control unit 15 advances to the $S_5$ state.

As described previously, a second absolute address is again established in circuitry 24 and during the succeeding $S_7$ state is transferred to a second instruction address register 41 via gate 40. Sequence control unit 15 again reverts to the $S_4$ state; the fourth syllable of the non-branch instruction depicted in FIG. 1B is brought out of memory 11 and stored in register 13. During succeeding states, a third absolute address associated with the non-branch instruction of FIG. 1B is established in circuitry 24 as described previously and during the $S_7$ state transferred to a third instruction address register 51 via gate 50. Signals $S_7'$, $S_7''$, and $S_7'''$ generated during the $S_7$ state by sequence control unit 15 are used to direct the absolute addresses to the proper instruction address registers. Since the fetch of the non-branch instruction of FIG. 1B is completed upon the transfer of the third absolute address to register 51, the sequence control unit 15 at this point advances to the $S_8$ state. When the sequence control unit 15 reaches the $S_8$ state, the fetch phase of operation is completed and associated circuitry within the computer system may commence the execution of this particular instruction. Addresses to be used during the execution of this instruction are now located within the registers 31, 41 and 51 and the first syllable of the instruction is located in register 19. The execution of the instruction does not form a part of the present invention and is not described herein.

It can be seen that apart from branch instructions, the fetch operation as described herein is independent of the particular instruction being fetched. The fetch operation proceeds automatically as described for all non-branch operations. For all such instructions no time is wasted as a result of the generalized fetch operation since all such instructions will be executed. Thus, any time spent in bringing subsequent syllables out of memory, in adding base, in indexing, and in indirect addressing is necessary since the absolute addresses which result from the performance of these operations will be utilized in the subsequent execution of the instruction being fetched. In the fetch of branch instructions this is not necessarily true since, if the branch is not taken, any time spent in bringing a relative address out of memory, adding base, indexing, or indirect addressing is wasted time. Since speed of operation is highly important in the operation of modern digital computer systems, it is highly advantageous to be able to avoid the performance of such unnecessary steps. As shown in the embodiment of this invention depicted in FIG. 2, these unnecessary steps are avoided in a manner which will now be described.

In the sequence of operations described previously for a branch instruction, the sequence control unit 15 determined during the $S_3$ state that the branch conditions were satisfied and that the branch therefore was to be taken. If, however, during the $S_3$ state the control unit 15 determines that the branch conditions are not satisfied, the sequence control unit 15 generates a signal $S_3'$ which is applied to gate 18 in conjunction with the SP signal to count up register 14 by "six." The sequence control unit 15 is then reset to state $S_1$. Since the non-selected branch instruction as depicted in FIG. 1 comprises two syllables, the register 14 will at this time have established therein an address corresponding to the first digit of the next succeeding instruction. As a result, the second syllable of a non-selected branch instruction need never be brought out of memory 11 and the performance of base addition, indexing, and indirect addressing of the relative address associated with the non-selected branch instruction need not be performed. The elimination of these unnecessary operations enables embodiments of the present invention to achieve a considerable time saving. Thus, for example, it has been estimated that in a particular computer system incorporating the present invention, the complete fetch of an non-taken branch instruction will require three microseconds and that the same system not utilizing the present invention would require a minimum of six microseconds for the complete fetch if no indexing and no indirect addressing were performed. Each indexing operation would add about eight microseconds and each indirect addressing operation would add about three microseconds. Since indirect addressing can be performed any number of times and indexing may be performed after each indirect addressing operation, there is no theoretical limit upon the maximum length of time such a non-taken branch could require. It may be estimated that such a non-taken branch would require an average of about fifteen microseconds. Thus, it can be seen that the incorporation of the present invention achieves a substantial time saving.

In the instruction fetch operations described hereinbefore the instruction words are capable of directly addressing 100,000 different addresses within the memory. This results because of the five-digit relative addresses associated with such instruction words. It is possible to increase the number of addresses addressable by such instructions by means of indexing and indirect addressing as described herein but such operations require both index registers and time.

It is another advantage of the present invention that the number of addresses directly addressable by branch instructions may be increased from 100,000 to 300,000 without necessitating either indexing or indirect addressing. This advantage is brought about by means of a particular significance given to otherwise non-used combinations of control bits stored in register 22. As previously described the two controller bits were utilized with respect to branch instructions to determine only whether indirect addressing is to be utilized or not. The designation of indirect addressing is achieved by means of only one of the four possible combinations of these two bits. Utilization of the other three combinations of these bits in connection with the execution of non-branch instructions is described in the copending application of the present applicant and Lloyd M. Cherry, Ser. No. 537,506, filed on even date herewith, and assigned to the assignee of this application.

In connection with the fetch of branch instructions, these three unused combinations of controller bits may be utilized to triple the number of addresses directly addressable by the branch instructions. Thus, the three otherwise unused combinations may be designated 0, 1, and 2 and added via gate 32 to the most significant digit of the absolute address being established in the register of block 24. Thus, without requiring any significant increase either in time or equipment, the number of addresses directly addressable by the embodiment shown in FIG. 2 may be tripled in accordance with this feature.

Figure 3:
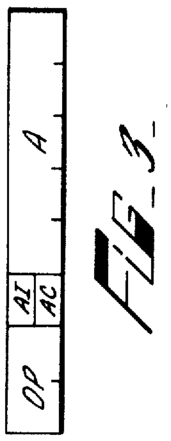
FIG. 3 depicts the format of a branch instruction which may be used alternatively to that depicted in FIG. 1A.

FIG. 3 depicts an alternative format of a branch instruction. The branch instruction of FIG. 1A comprises two syllables with four digit positions of the first syllable being unused. The branch instruction format shown in FIG. 3 saves memory space by utilizing a total of eight digit positions rather than twelve digit positions and eliminating the four unused digit positions shown in FIG. 1.

Figure 4:
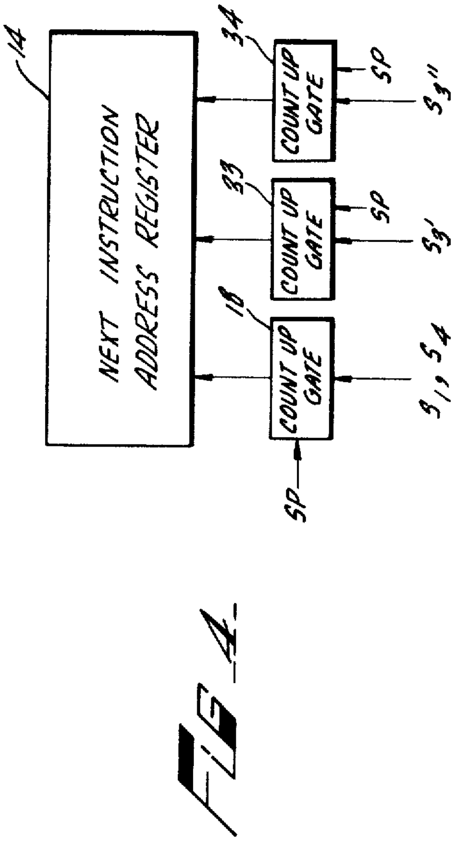
FIG. 4 depicts modifications of the block diagram depicted in FIG. 2 which accommodate branch instructions of the format shown in FIG. 3.

FIG. 4 depicts modifications which may be made to the embodiment shown in FIG. 2 to accommodate branch instructions in accordance with the format of FIG. 3 rather than that of FIG. 1. Two additional gates, count up gate 33 and count down gate 34, are shown in FIG. 4. Count up gate 18 is identical to the similarly numbered gate in FIG. 2 and will, when activated, increase by "six" the address stored in register 14. Count up gate 33 will on the other hand increase the address stored in register 14 by "two" and count down gate 34 will decrease the address stored in register 14 by "four."

At the conclusion of the $S_1$ state, register 14 will be storing the address of the fourth digit of the A field whenever a branch instruction is being fetched. If during state $S_3$ sequence control unit 15 determines that the branch instruction is not to be taken, a signal $S_3'$ generated by control unit 15 activates gate 33 which counts up the address stored in register 14 by "two." At this time register 14 will be storing the address of the first digit of a subsequent instruction just as in the embodiment of FIG. 2 previously described.

If during state $S_3$ sequence control unit 15 determines that the branch instruction is to be taken, a signal $S_3''$ generated by control unit 15 activates gate 34 which counts down the address stored in register 14 by "four." At this time register 14 will be storing the address of the first digit of the A field associated with the branch instruction being executed just as in the case of the embodiment of FIG. 2 when a branch instruction is to be executed.

What have been described are considered to be only illustrative embodiments of the present invention. Accordingly, it is to be understood that various and numerous other arrangements may be devised by one skilled in the art without departing from the spirit and scope of the invention.

What is claimed is:

1. A data processing system comprising:
memory means for storing a plurality of digitally coded words;
a first register storing the address of a first instruction word stored in the memory;
means for transferring to a second register a first part of the instruction word located at the address stored in the first register, the transferred part of the word including bits designating a particular operation;
means utilizing the operation bits for determining whether the instruction word denotes a conditional branch operation;
means responsive to the determination of a conditional branch operation for determining whether the branch conditions have been satisfied;
means responsive to a determination that the branch conditions have not been satisfied for setting into the first register the address of a succeeding instruction word;
means responsive to a determination that the branch conditions have been satisfied for transferring to a third register a second part of the first instruction word, the transferred part of the word including bits designating a relative address;
means for performing predetermined manipulations upon the relative address thereby obtaining an absolute address; and
means for storing the absolute address in the first register.

2. A data processing system comprising:
memory means for storing a plurality of digitally coded words;
a first register storing $m$ bits denoting the address of a first instruction word stored in the memory;
means for transferring to a second register a part of the instruction word located at the address stored in the first register, the transferred part of the word including bits designating a particular operation;
means utilizing the operation bits for determining whether the instruction word denotes a conditional branch operation;
means responsive to the determination of a conditional branch operation for determining whether the branch conditions have been satisfied;
means responsive to a determination that the branch conditions have not been satisfied for setting into the first register $m$ bits denoting the address of a succeeding instruction word;
means responsive to a determination that the conditions have been satisfied for transferring to a third register bits comprising the remainder of the first instruction word;
means for transferring $n$ of the bits stored in the third register to a controller register;
means for transferring the remaining $o$ bits stored in the third register to a fourth register, the $o$ bits stored in the fourth register comprising a relative address;
means responsive to the particular $n$ bits stored in the controller register for performing predetermined manipulations upon the $o$ bits stored in the fourth register thereby obtaining an $m$-bit absolute address; and
means for storing the $m$-bit absolute address in the first register.

3. A data processing system according to claim 2 in which the means for performing predetermined manipulations comprises a plurality of index registers each storing a different digital value and means responsive to the particular $n$ bits stored in the controller register for adding the digital value stored in one of the index registers to the relative address.

4. A data processing system comprising:
memory means for storing a plurality of digitally coded words;
a first register storing $m$ bits denoting the address of a first instruction word stored in the memory;

means for transferring to a second register a part of the instruction word located at the address stored in the first register, the transferred part of the word including bits designating a particular operation;
means utilizing the operation bits for determining whether the instruction word denotes a conditional branch operation;
means responsive to the determination of a conditional branch operation for determining whether the branch conditions have been satisfied;
means responsive to a determination that the branch is not to be taken for setting into the first register $m$ bits denoting the address of a succeeding instruction word;
means responsive to a determination that the branch is to be taken for transferring to a third register bits comprising the remainder of the first instruction word;
means for transferring a particular $n$ of the bits stored in the third register to a controller register;
means for transferring the remaining $o$ bits stored in the third register to a fourth register, the $o$ bits stored in the fourth register comprising a first relative address;
a plurality of bits representative of a predetermined digital value stored in a base address register;
means for adding the digital value stored in the base address to the relative address thereby obtaining a first $m$-bit absolute address;
means responsive to the particular $n$ bits stored in the controller register for transferring to the third register the $n+o$ bits stored in memory at the address denoted by the first absolute address;
the aforesaid transferring means transferring a particular $n$ of the bits to the controller register and the remaining $o$ bits to the fourth register, respectively, the $o$ bits now stored in the fourth register comprising a second relative address;
means, including the aforesaid adding means, responsive to the $n$ bits now stored in the controller register for performing predetermined manipulations upon the $o$ bits now stored in the fourth register thereby obtaining a second $m$-bit absolute address; and
means for storing the second $m$-bit absolute address in the first register.

5. A data processing system comprising:
memory means for storing a plurality of binary coded words including a plurality of instruction words, the instruction words including conditional branch instructions having a single relative address associated therewith and non-branch instructions having a plurality of relative addresses associated therewith;
each of the words comprising individually addressable digits, a particular number of such digits constituting a syllable;
a first register storing the address of the first digit of a first instruction word stored in the memory;
means for transferring to a second register the first syllable of the first instruction word, the transferred first syllable including bits designating a particular operation;
means utilizing the operation bits for determining whether the instruction word denotes a conditional branch operation;
means responsive to the determination of a conditional branch operation for determining whether the branch conditions have been satisfied;
means responsive to a determination that the branch is not to be taken for setting into the first register the address of the first digit of a succeeding instruction word;
means responsive to a determination that the branch is to be taken for transferring to a third register a syllable of the first instruction which includes the relative address associated therewith;

means for performing predetermined manipulations upon the relative address thereby obtaining an absolute address; and means for storing the absolute address in the first register.

6. A data processing system comprising:

memory means for storing a plurality of binary coded words including a plurality of instruction words, the instruction words including conditional branch instructions having a single address field associated therewith and non-branch instructions having a plurality of address fields associated therewith;

each of the words comprising individually addressable digits, a particular number of such digits constituting a syllable;

each address field comprising a syllable of digits, a first digit of which comprises indexing and controller bits and the remaining digits of which comprise a relative address;

a first register storing the address of the first digit of a first instruction word stored in the memory;

means for transferring to a second register the first syllable of the first instruction word, the transferred first syllable including digits designating a particular operation;

means utilizing the operation digits for determining whether the instruction word denotes a conditional branch instruction and, responsive to the determination of a conditional branch instruction, for determining whether the branch conditions have been satisfied;

means responsive to a determination that the branch conditions have not been satisfied for setting into the first register the address of the first digit of a succeeding instruction word;

means responsive to a determination that the branch conditions have been satisfied for transferring to a third register the address field associated with the branch instruction;

means for transferring to a fourth register the indexing and controller bits of the address field stored in the third register;

means for transferring to a fifth register the relative address stored in the third register;

means for performing manipulations upon the relative address stored in the third register comprising a base register containing predetermined digital values, means for adding the contents of the base register to the relative address, a plurality of index registers each containing different predetermined digital values, and means controlled by the indexing bits stored in the fourth register for adding the contents of a particular one of the index registers to the relative address; and means for storing in the first register the absolute address obtained as a result of the manipulations performed by the last mentioned means.

7. A data processing system according to claim 6 in which the means for performing manipulations further comprises means controlled by one particular combination of the controller bits stored in the fourth register for transferring to the second register the address resulting from the base addition and indexing operations.

8. A data processing system according to claim 6 in which each conditional branch instruction word comprises two syllables, the first syllable including the operation digits of the word and the second syllable consisting of the address field associated with the word.

9. A data processing system according to claim 6 in which each conditional branch instruction word consists of operation code digits and address field digits and further comprising means responsive to a determination that the branch conditions have been satisfied for setting into the first register the address of the first digit of the address field.

10. A data processing system according to claim 6 further comprising:

a plurality of non-branch instruction adress registers;

the determining means, upon determination of a non-branch instruction, determining the number of address fields associated with the non-branch instruction;

the three last mentioned transferring means and the manipulating means sequentially performing operations on the address fields associated with the non-branch instruction and sequentially obtaining a plurality of absolute addresses equal to the number of address fields; and means for storing each of the absolute addresses in a different one of the non-branch instruction address register.

11. A data processing system according to claim 7 further comprising:

means controlled by other particular combinations of the controller bits stored in the fourth register for adding to the most significant digit of the relative address a different digital value denoted by each of the other particular combinations of the controller bits.

12. In a computer system:

memory means for storing a plurality of binary coded words including a plurality of instruction words, the instruction words including conditonal branch instructions having a single address field associated therewith and non-branch instructions having a plurality of address fields associated therewith;

each of the words comprising individually addressable digits, a particular number of such digits constituting a syllable;

each address field comprising a syllable of digits, a first digit of which comprises controller bits and the remaining digits of which comprise a relative address;

a first register storing the address of the first digit of a first instruction word stored in the memory;

means for transferring to a second register the first syllable of the first instruction word, the transferred first syllable including digits designating a particular operation;

means utilizing the operation digits for determining whether the instruction word denotes a conditional branch instruction and, responsive to the determination of a conditional branch instruction, for determining whether the branch conditions have been satisfied;

means responsive to a determination that the branch conditions have not been satisfied for setting into the first register the address of the first digit of a succeeding instruction word;

means responsive to a determination that the branch conditions have been satisfied for transferring to a third register the address field associated with the branch instruction;

means for transferring to a fourth register the first digit of the address field stored in the third register;

means for transferring to a fifth register the relative address stored in the third register;

a base register containing predetermined digital values;

means for adding the contents of the base register to the relative address;

means responsive to one particular combination of the controller bits for performing predetermined manipulations upon the digital value resulting from the addition of the contents of the base register to the relative address;

means responsive to other particular combinations of the controller bits for adding a predetermined digital value to the most significant digit of the digital value resulting from the addition of the contents of the base register to the relative address thereby obtaining an absolute address, a different predetermined digital value being denoted by each of the other particular combinations of controller bits; and means for storing the absolute address in the first register.

13. In a computer system:

memory means for storing a plurality of binary coded words including a plurality of instruction words, the instruction words including branch instructions having a single address field associated therewith;

each of the words comprising individually addressable digits, a particular number of such digits constituting a syllable;

each address field comprising a syllable of digits, a first digit of which comprises controller bits and the remaining digits of which comprise a relative address;

a first register storing the address of the first digit of a first instruction word stored in the memory;

means for transferring to a second register the first syllable of the first instruction word, the transferred first syllable including digits designating a particular operation;

means utilizing the operation digits for determining whether the instruction words denote a branch instruction;

means responsive to the determination of a branch instruction for transferring to a third register the address field associated with the branch instruction;

means for transferring to a fourth register the first digit of the address field stored in the third register;

means for transferring to a fifth register the relative address stored in the third register;

a base register containing predetermined digital values;

means for adding the contents of the base register to the relative address;

means responsive to one particular combination of the controller bits for performing predetermined manipulations upon the digital value resulting from the addition of the contents of the base register to the relative address;

means responsive to other particular combinations of the controller bits for adding a predetermined digital value to the most significant digit of the digital value resulting from the addition of the contents of the base register to the relative address thereby obtaining an absolute address, a different predetermined digital value being denoted by each of the other particular combinations of controller bits; and means for storing the absolute address in the first register.

14. In a computer system:

memory means for storing a plurality of digitally coded words;

a first register storing the address of a first instruction word stored in the memory;

means for transferring to a second register a part of the instruction word located at the address stored in the first register, the transferred part of the word including bits designating a particular operation;

means utilizing the operation bits for determining whether the instruction word denotes a branch operation;

means responsive to the determination of a branch operation for transferring to a third register bits of the first instruction word comprising controller bits and for transferring to a fourth register bits of the first instruction word comprising relative address bits;

a base register containing bits representing a predetermined numerical value;

means for adding the base register bits to the relative address bits;

means responsive to one particular combination of the controller bits for performing predetermined manipulations upon the bits resulting from the addition of the base register bits and the relative address bits;

means responsive to other particular combinations of the controller bits for adding bits representing a predetermined numerical value to the bits resulting from the addition of the base register bits and the relative address bits thereby obtaining bits denoting an absolute address, a different predetermined numerical value being denoted by each of the other particular combinations of controller bits; and means for storing the absolute address bits in the first register.

References Cited

UNITED STATES PATENTS

| | | | |
|---|---|---|---|
| 3,239,820 | 3/1966 | Logan et al. ------- | 340—172.5 |
| 3,292,155 | 12/1966 | Neilson ---------- | 340—172.5 |
| 3,319,226 | 5/1967 | Mott et al. -------- | 340—172.5 |

PAUL J. HENON, *Primary Examiner.*